(12) United States Patent
Fujihara et al.

(10) Patent No.: US 9,783,370 B2
(45) Date of Patent: Oct. 10, 2017

(54) ARTICLE SORTING APPARATUS

(71) Applicant: Kabushiki Kaisha Toshiba, Minato-ku (JP)

(72) Inventors: Hiroaki Fujihara, Kawasaki (JP); Osamu Maruyama, Yokohama (JP); Yusuke Mitsuya, Yokohama (JP)

(73) Assignee: Kabushiki Kaisha Toshiba, Minato-ku (JP)

( * ) Notice: Subject to any disclaimer, the term of this patent is extended or adjusted under 35 U.S.C. 154(b) by 0 days.

(21) Appl. No.: 15/057,266

(22) Filed: Mar. 1, 2016

(65) Prior Publication Data
US 2016/0257502 A1    Sep. 8, 2016

(30) Foreign Application Priority Data

Mar. 3, 2015    (JP) ................... 2015-041445

(51) Int. Cl.
| | |
|---|---|
| *B65G 47/10* | (2006.01) |
| *B65G 43/08* | (2006.01) |
| *B07C 5/36* | (2006.01) |
| *B07C 3/00* | (2006.01) |
| *B65G 65/00* | (2006.01) |
| *G01G 11/02* | (2006.01) |
| *G01G 11/04* | (2006.01) |

(Continued)

(52) U.S. Cl.
CPC ............. *B65G 43/08* (2013.01); *B07C 3/003* (2013.01); *B07C 5/36* (2013.01); *B65G 47/96* (2013.01); *B65G 65/005* (2013.01); *G01G 11/02* (2013.01); *G01G 11/04* (2013.01); *G01G 11/12* (2013.01)

(58) Field of Classification Search
CPC .............................. B65G 43/08; B65G 17/345

USPC ....................................... 198/370.01, 370.06
See application file for complete search history.

(56) References Cited

U.S. PATENT DOCUMENTS

| | | | |
|---|---|---|---|
| 5,588,520 | A | 12/1996 | Affaticati et al. |
| 7,080,725 | B2 | 7/2006 | Hishinuma |

(Continued)

FOREIGN PATENT DOCUMENTS

EP    0 700 844 A2    3/1996

OTHER PUBLICATIONS

Extended European Search Repot dated Jul. 5, 2016 in Patent Application No. 16158126.9.

*Primary Examiner* — William R Harp
(74) *Attorney, Agent, or Firm* — Oblon, McClelland, Maier & Neustadt, L.L.P.

(57) ABSTRACT

An article sorting apparatus includes: a conveyance path extending in a first conveyance direction; at least one conveyance unit including a belt that forms a load surface on which an article is placed and a driving portion to drive the belt, and configured to move along the conveyance path and to convey the article placed on the load surface in a second conveyance direction that intersects the first conveyance direction; a loading portion configured to load the article onto the load surface; a sorting portion configured to sort the article received from the at least one conveyance unit; a weight information detector configured to detect weight information correlated with weight of the article transferred to the load surface; and a controller configured to control driving the driving portion in accordance with the detected weight information, to transfer the article placed on the load surface to the sorting portion.

10 Claims, 8 Drawing Sheets

(51) Int. Cl.
*G01G 11/12* (2006.01)
*B65G 47/96* (2006.01)

(56) References Cited

U.S. PATENT DOCUMENTS

| | | | | |
|---|---|---|---|---|
| 7,212,884 | B2* | 5/2007 | Kappelgaar | B65G 17/345 198/349 |
| 9,452,893 | B1 | 9/2016 | Fujihara et al. | |
| 2002/0063037 | A1* | 5/2002 | Bruun | B65G 37/02 198/370.01 |
| 2003/0221935 | A1 | 12/2003 | Barklin et al. | |
| 2014/0142746 | A1* | 5/2014 | Vegh | B65G 43/08 700/229 |
| 2015/0239015 | A1 | 8/2015 | Asari et al. | |
| 2016/0052722 | A1 | 2/2016 | Fujihara et al. | |

\* cited by examiner

ARTICLE SORTING APPARATUS

CROSS-REFERENCE TO RELATED APPLICATION

This application is based upon and claims the benefit of priority from Japanese Patent Application No. 2015-041445, filed on Mar. 3, 2015; the entire contents of which are incorporated herein by reference.

FIELD

Embodiments described herein relate generally to an article sorting apparatus.

BACKGROUND

Conventionally, there are cross belt sorters that convey a plurality of cells on a conveyance path and that also transfer articles in a direction orthogonal to a conveyance direction using a belt mechanism that is provided in each of the plurality of cells. The cross belt sorters load articles onto belts of belt mechanisms of respective cells from injectors and transfer the articles to chutes corresponding to sorting destinations of the respective articles by driving the belts when the cells are adjacent to the corresponding chutes. However, during the transfer of articles on the belts of the cells to the chutes by the belt mechanisms, if the release timing varies depending on the weight of the articles, there is a possibility that appropriate sorting of the articles may be difficult. If the inlet width of the chutes is increased to accommodate the variation of the release timing of articles, there is a possibility that the size of the conveyance path may increase, and accordingly the installation area of the conveyance path may increase.

DETAILED DESCRIPTION

According to one embodiment, there is provided an article sorting apparatus including: a conveyance path extending in a first conveyance direction; at least one conveyance unit including a belt that forms a load surface on which an article is placed and a driving portion for driving the belt, the conveyance unit being configured to move along the conveyance path and to convey the article placed on the load surface in a second conveyance direction that intersects the first conveyance direction; a loading portion configured to load the article onto the load surface of the at least one conveyance unit; a sorting portion configured to sort the article received from the at least one conveyance unit; a weight information detector configured to detect weight information correlated with a weight of the article that is transferred from the loading portion to the load surface; and a controller configured to control driving of the driving portion in accordance with the weight information detected by the weight information detector, thereby transferring the article placed on the load surface to the sorting portion.

Hereinafter, an article sorting apparatus according to an embodiment will be described with reference to the drawings.

Figure 1:
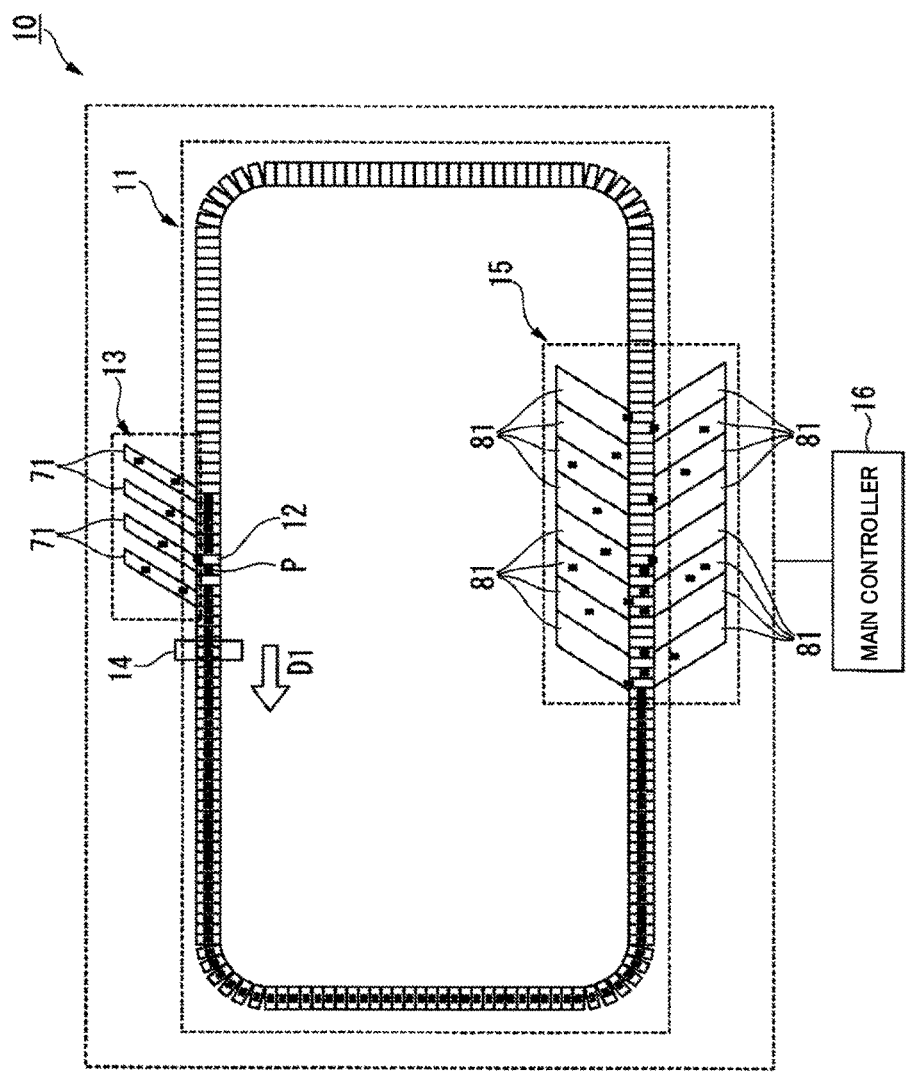
FIG. 1 is a plan view schematically showing the configuration of an article sorting apparatus according to an embodiment.

As shown in FIG. 1, an article sorting apparatus 10 according to the embodiment includes a conveyance path 11 and a plurality of conveyor cells 12 as well as a loading portion 13, an information acquisition portion 14, a sorting portion 15, and a main controller 16 that are arranged along the conveyance path 11, the main controller 16 performing overall control of the article sorting apparatus 10.

Figure 2:
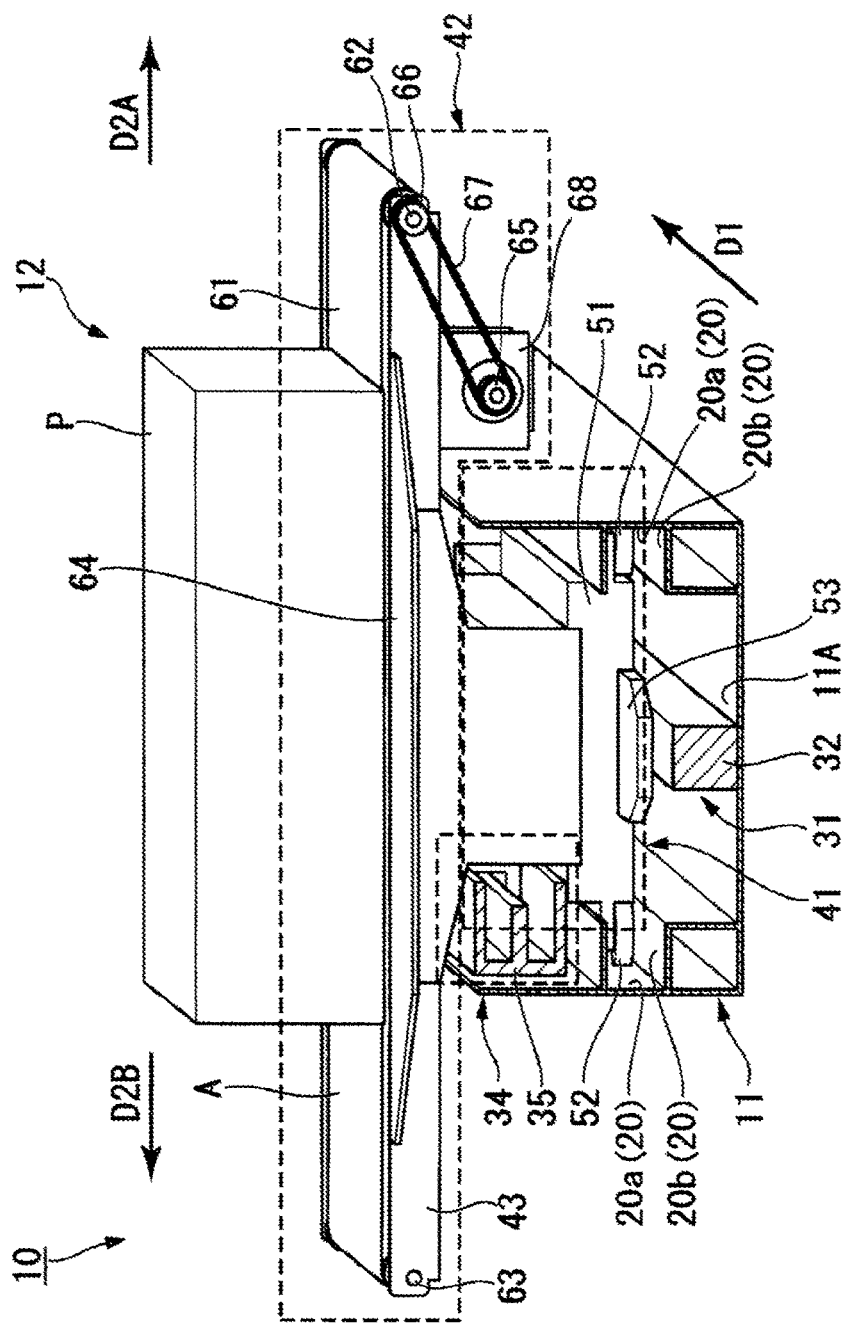
FIG. 2 is a perspective view schematically showing the configuration of a conveyor cell of the article sorting apparatus according to the embodiment.
Figure 3:
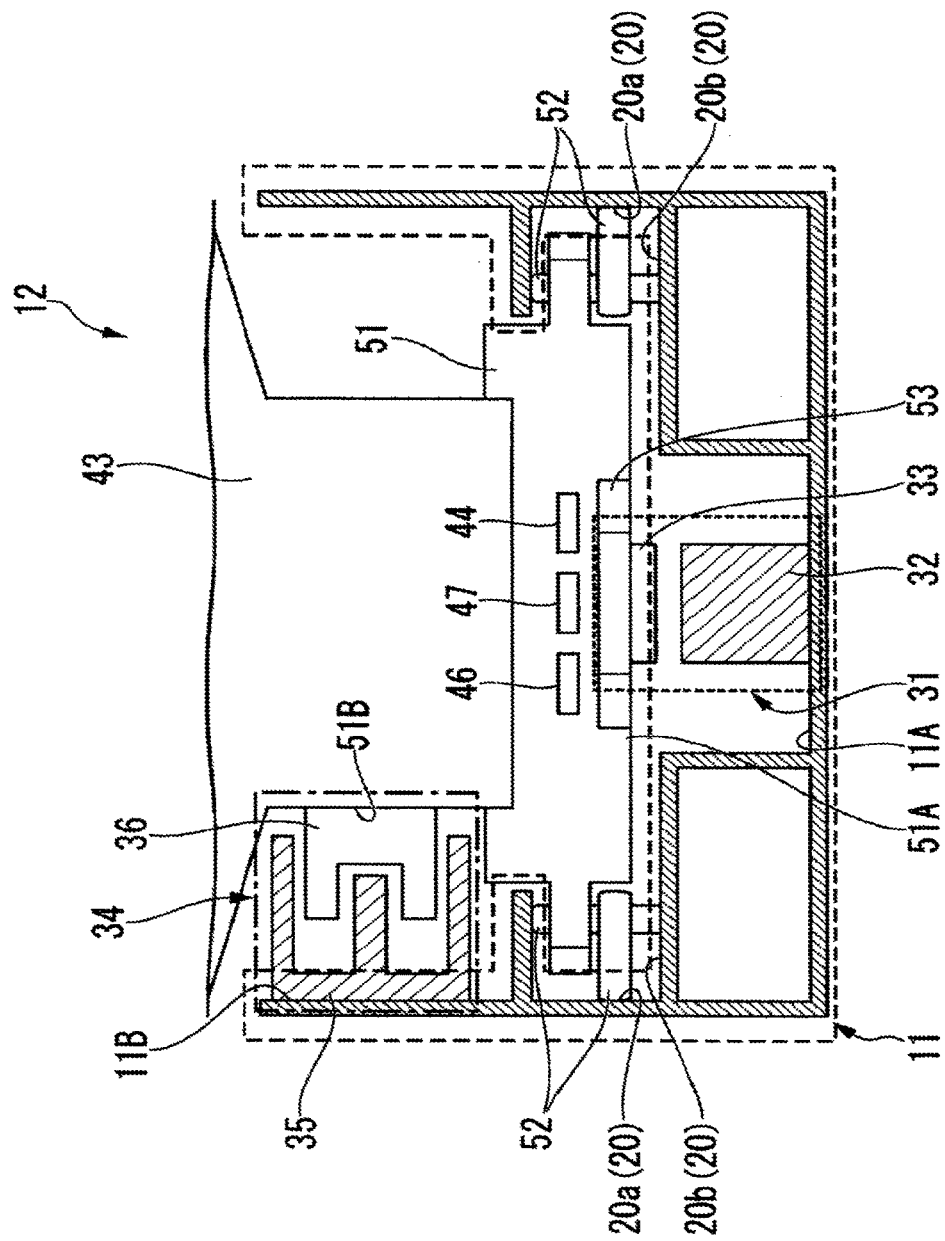
FIG. 3 is a cross-sectional view schematically showing the configuration of a portion of the conveyor cell of the article sorting apparatus according to the embodiment.

The conveyance path 11 forms a circulation (cyclic) path that guides each of the plurality of conveyor cells 12. The conveyance path 11 guides each conveyor cell 12 to the loading portion 13, the information acquisition portion 14, and the sorting portion 15, sequentially, in a first conveyance direction D1 (i.e., counterclockwise conveyance direction shown in FIG. 1) along the circulation (cyclic) path. As shown in FIGS. 2 and 3, the conveyance path 11 is provided with guide walls 20 (e.g., first guide wall 20a and second guide wall 20b) that come into contact with guide rollers 52 of each conveyor cell 12, which will be described later, and thus guide the course of the guide rollers 52.

Figure 4:
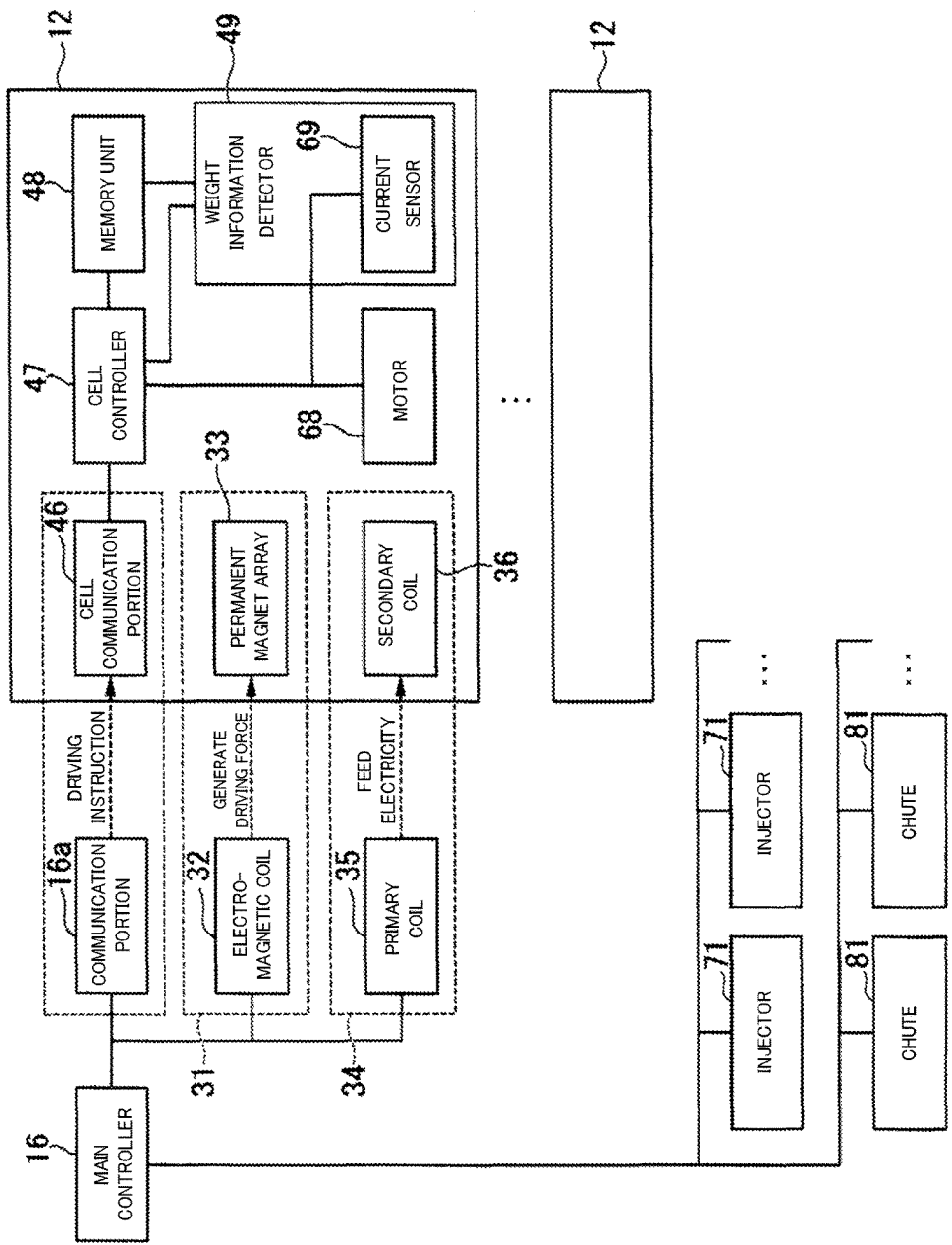
FIG. 4 is a block diagram schematically showing the configuration of a portion of the article sorting apparatus according to the embodiment.

The conveyance path 11 and the plurality of conveyor cells 12 are provided with a linear synchronous motor 31 that drives each conveyor cell 12 along the conveyance path 11. The linear synchronous motor 31 includes, for example, an electromagnetic coil 32 that is provided along the entire length of the conveyance path 11 and that serves as a stator, and a permanent magnet array 33 that is provided in each of the plurality of conveyor cells 12 and that serves as a mover. The linear synchronous motor 31 produces a driving force (conveying force) in the first conveyance direction D1 in the permanent magnet array 33 using the electric current flowing through the electromagnetic coil 32. As shown in FIG. 4, the state of the electric current flowing through the electromagnetic coil 32 is controlled by the main controller 16, and thus the linear synchronous motor 31 conveys each conveyor cell 12 in the direction D1 at any desired speed and acceleration by means of the conveying force acting on the permanent magnet array 33.

The conveyance path 11 and the plurality of conveyor cells 12 are provided with a noncontact feeding portion 34 that feeds power from the conveyance path 11 to each conveyor cell 12. The noncontact feeding portion 34 includes, for example, a primary coil 35 that is provided over the entire length of the conveyance path 11 and a secondary coil 36 that is provided in each of the plurality of conveyor cells 12. The noncontact feeding portion 34 feeds power from the conveyance path 11 to each conveyor cell 12 by electromagnetic induction between the primary coil 35 and the secondary coil 36.

The plurality of conveyor cells 12 that are moved along the conveyance path 11 are arranged in a line in the first conveyance direction D1. The conveyor cells 12 that are adjacent to each other on the front side and the rear side in the first conveyance direction D1 are coupled to each other, for example. Each of the plurality of conveyor cells 12 includes a chassis portion 41, a cross belt mechanism 42, a frame portion 43 to which the chassis portion 41 and the cross belt mechanism 42 are fixed, a battery 44, a cell communication portion 46, a cell controller 47, and a memory unit 48.

The chassis portion 41 includes a chassis 51 serving as the base for the entire conveyor cell 12, two guide rollers 52 supported by the chassis 51, and connection mechanisms 53. With respect to the chassis 51, for example, the permanent magnet array 33 of the linear synchronous motor 31 is fixed to an under surface 51A of the chassis 51 that opposes a bottom face 11A of the conveyance path 11. Thus, the chassis 51 allows the permanent magnet array 33 to be disposed opposing the electromagnetic coil 32 that is provided on the bottom face 11A of the conveyance path 11. With respect to the chassis 51, for example, the secondary coil 36 of the noncontact feeding portion 34 is fixed to a side face 51B of the chassis 51 that opposes an inner wall surface 11B of the conveyance path 11. Thus, the chassis 51 allows the secondary coil 36 to be disposed opposing the primary coil 35 that is provided on the inner wall surface 11B of the conveyance path 11.

Each of the two guide rollers 52 has a rotation shaft (not shown) that is supported by the chassis 51. When the conveyor cell 12 is conveyed along the conveyance path 11, each guide roller 52 rotates about its rotation shaft while coming into contact with the guide wall 20 (i.e., first guide wall 20a and second guide wall 20b) of the conveyance path 11. Thus, the guide rollers 52 guide the conveyor cell 12 to the course that is guided by the guide walls 20 of the conveyance path 11.

The connection mechanisms 53 are respectively fixed to a front portion and a rear portion of the chassis 51. The connection mechanisms 53 of each conveyor cell 12 are coupled to the corresponding connection mechanisms 53 of other conveyor cells 12 that are adjacent to that conveyor cell 12 respectively on the front side and the rear side thereof in the first conveyance direction D1 so as to be rotatable about at least a vertical rotation shaft (not shown). Thus, the conveyor cells 12 that are adjacent to each other on the front side and the rear side in the first conveyance direction D1 are coupled to each other by their connection mechanisms 53 without obstructing each other's operation.

The cross belt mechanism 42 is fixed to the chassis portion 41 by the frame portion 43 made of metal, for example. The cross belt mechanism 42 conveys an article P loaded thereon in a second conveyance direction (e.g., first transfer direction D2A and second transfer direction D2B that are opposite to each other) that is orthogonal to the first conveyance direction D1. The first transfer direction D2A is, for example, the rightward direction of the conveyor cell 12 as viewed in the first conveyance direction D1. The second transfer direction D2 is, for example, the leftward direction of the conveyor cell 12 as viewed in the first conveyance direction D1. The cross belt mechanism 42 includes a cross belt 61, a driving roller 62, a driven roller 63, a belt support board 64, a motor-side toothed pulley 65, a roller-side toothed pulley 66, a timing belt 67, a motor 68, and a current sensor 69 (FIG. 4).

Figure 5:
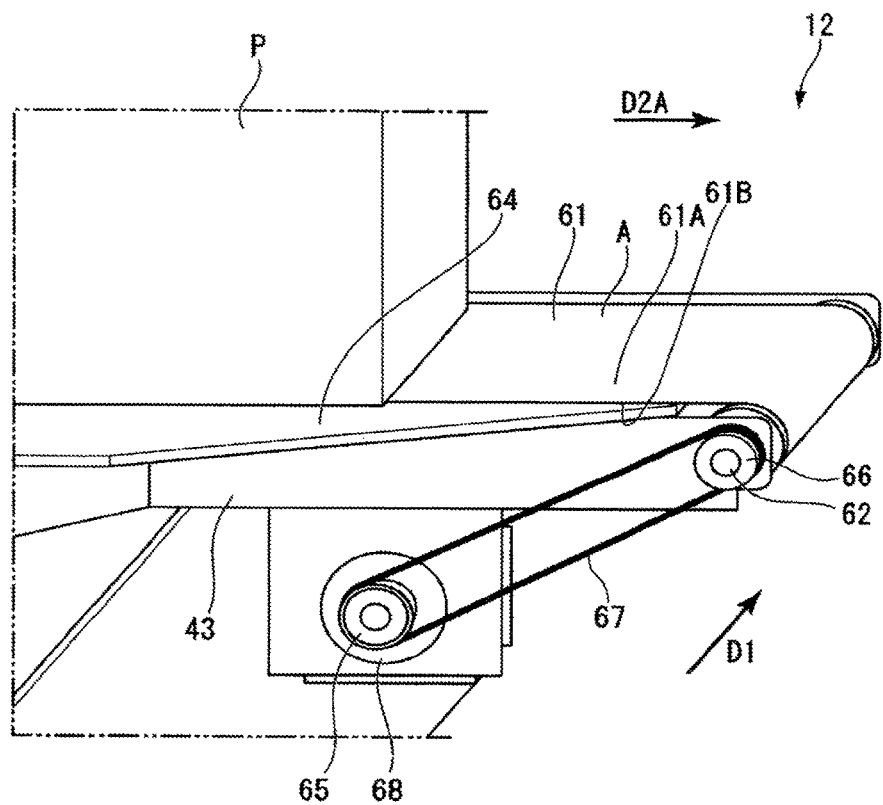
FIG. 5 is a perspective view schematically showing the configuration of a portion of the conveyor cell of the article sorting apparatus according to the embodiment.

The cross belt 61 is a tubular endless belt formed of a flat belt, for example. The surface of the cross belt 61 is coated with a synthetic resin such as polyvinyl chloride, polyurethane, or synthetic rubber, for example. The cross belt 61 is stretched between the driving roller 62 and the driven roller 63. The cross belt 61 is rotated by a rotational driving force of the driving roller 62, thereby rotating the driven roller 63. The driving roller 62 and the driven roller 63 are arranged parallel to each other with a predetermined distance left therebetween in the left-right direction (i.e., first transfer direction D2A and second transfer direction D2B) of the conveyor cell 12. As shown in FIG. 5, an upper surface of an outside surface 61A of the cross belt 61, a normal to that upper surface extending in the vertically upward direction, forms a load surface A on which an article P is placed. The belt support board 64 supports a portion of an internal surface 61B of the cross belt 61, the portion constituting a back face of the load surface A. Thus, the belt support board 64 prevents bending of the cross belt 61 against the weights of the cross belt 61 and the article P placed on the load surface A.

The driving roller 62 and the driven roller 63 each have a rotation shaft (not shown) that is supported by the frame portion 43. The respective rotation shafts of the driving roller 62 and the driven roller 63 are arranged extending in the front-rear direction (i.e., first conveyance direction D1) of each conveyor cell 12 and parallel to each other with a predetermined distance left therebetween in the left-right direction (i.e., first transfer direction D2A and second transfer direction D2B) of each conveyor cell 12. The motor-side toothed pulley 65 is coaxially connected to the motor 68. The roller-side toothed pulley 66 is coaxially connected to the driving roller 62. The timing belt 67 is a toothed endless belt meshing with the motor-side toothed pulley 65 and the roller-side toothed pulley 66. The timing belt 67 is stretched between the motor-side toothed pulley 65 and the roller-side toothed pulley 66. The timing belt 67 is rotated by a rotational driving force of the motor-side toothed pulley 65, thereby rotating the roller-side toothed pulley 66.

The motor 68 is a servo motor that is controlled by the cell controller 47. The motor 68 is coaxially connected to the motor-side toothed pulley 65. The motor 68 produces a rotational driving force using power that is fed from the noncontact feeding portion 34, and thus rotates the motor-side toothed pulley 65. The timing belt 67 transmits the rotation of the motor-side toothed pulley 65 to the roller-side toothed pulley 66. The roller-side toothed pulley 66 drives and rotates the driving roller 62. The driving roller 62 transmits the rotation to the cross belt 61 and the driven roller 63. Thus, the cross belt 61 is driven in the left-right direction of each conveyor cell 12, thereby transferring the article P placed on the load surface A in the first transfer direction D2A and the second transfer direction D2B. The current sensor 69 detects the electric current flowing through the motor 68. For example, the current sensor 69 detects a regenerative current flowing through the motor 68 during deceleration of the motor 68. "Regenerative current" refers to an electric current that flows backward from the motor 68 when the motor 68 is operated as a generator.

The battery 44 is provided in the chassis portion 41. The battery 44 stores power that is fed from the noncontact feeding portion 34. The cell communication portion 46 is provided in the chassis portion 41. The cell communication portion 46 sends/receives various types of information by contactless communication (e.g., infrared communication, wireless communication, or the like) between the cell controller 47 and a communication portion 16a connected to the main controller 16. The cell communication portion 46 is operated by power that is fed from the battery 44.

The cell controller 47 may be, for example, a PLC (programmable logic controller), a control board, or the like. The cell controller 47 is fixed to the chassis portion 41. The cell controller 47 is operated by power that is fed from the battery 44. The cell controller 47 controls driving of the motor 68 in accordance with a control instruction that is output from the main controller 16. The memory unit 48 stores various data. For example, the memory unit 48 stores data on a driving pattern that is used by the cell controller 47 when controlling driving of the motor 68.

Figure 6:
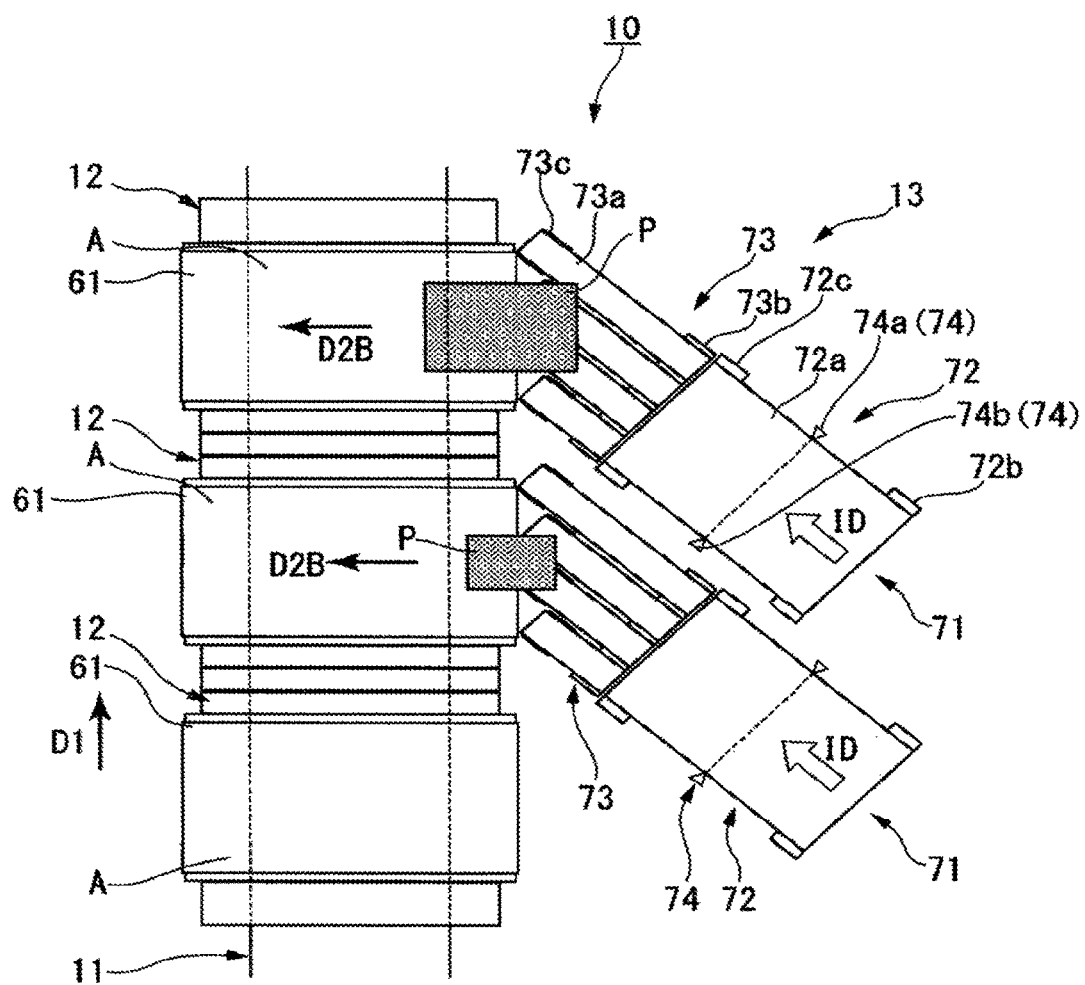
FIG. 6 is a plan view schematically showing the configuration of a loading portion and some of conveyor cells of the article sorting apparatus according to the embodiment.

As shown in FIG. 1, the loading portion 13 loads articles P onto the plurality of conveyor cells 12. For example, the loading portion 13 is disposed on an outward side of the conveyance path 11, that is, on the right side of the conveyance path 11 (the first transfer direction D2A side of the conveyor cells 12) as viewed in the first conveyance direction D1 if the first conveyance direction D1 is a counterclockwise conveyance direction. The loading portion 13 includes at least one or more (e.g., a plurality of) injectors 71. As shown in FIG. 6, each of the injectors 71 includes a first conveyance portion 72 and a second conveyance portion 73 that are arranged in a transfer direction ID intersecting the first conveyance direction D1 of the conveyance path 11 at a predetermined acute angle.

The first conveyance portion 72 includes a first transfer belt 72a that is driven in the transfer direction ID as well as a first driving roller 72b and a first driven roller 72c between which the first transfer belt 72a is stretched. The first driving roller 72b and the first driven roller 72c are arranged parallel to each other with a predetermined distance left therebetween in the transfer direction ID. The first transfer belt 72a is rotated by a rotational driving force of the first driving roller 72b, thereby rotating the first driven roller 72c. The second conveyance portion 73 includes a plurality of second transfer belts 73a that are driven in the transfer direction ID. Each of the second transfer belts 73a is formed such that its width (belt width in a direction orthogonal to the transfer direction ID) is smaller than the width of the first transfer belt 72a. The plurality of second transfer belts 73a are arranged at predetermined intervals in the width direction (i.e., the direction orthogonal to the transfer direction ID). Each of the second transfer belts 73a is stretched between a second driving roller 73b and a second driven roller 73c that are arranged parallel to each other with a predetermined distance left therebetween in the transfer direction ID. Each second transfer belt 73a is rotated by a rotational driving force of the second driving roller 73b, thereby rotating the second driven roller 73c. Thus, each injector 71 successively transfers articles P in the transfer direction ID, which intersects the first conveyance direction D1 of the conveyance path 11 at a predetermined acute angle, from the first conveyance portion 72 and the second conveyance portion 73 to desired conveyor cells 12.

Each injector 71 includes an article length sensor 74 that is disposed in the first conveyance portion 72. The article length sensor 74 includes a light emitting portion 74a and a light receiving portion 74b that are arranged opposing each other so as to cross over the first conveyance portion 72. Irradiation light that is output from the light emitting portion 74a is received by the light receiving portion 74b if no article P is present on its optical axis. The article length sensor 74 outputs an ON signal if an article P is present on the optical axis of the irradiation light that is output from the light emitting portion 74a and interrupts the receipt of the irradiation light by the light receiving portion 74b. The article length sensor 74 outputs an OFF signal if no article P is present on the optical axis of the irradiation light that is output from the light emitting portion 74a, and the light receiving portion 74b continues receiving the irradiation light. The article length sensor 74 detects an ON time from the occurrence of switching from the OFF signal to the ON signal to the occurrence of switching from the ON signal to the OFF signal. The article length sensor 74 detects the length of an article P from the detected ON time and a previously known transfer speed of articles P in each injector 71. The article length sensor 74 outputs information on the detected length of the article P to the main controller 16.

The information acquisition portion 14 shown in FIG. 1 includes, for example, an optical character recognition (OCR) device or a code reader that reads a one-dimensional code, a two-dimensional code, or the like. The information acquisition portion 14 acquires information on a sorting destination, for example, the information being applied to individual articles P that are loaded on the conveyor cells 12, and sends the acquired information to the main controller 16.

The sorting portion 15 receives articles P that are individually released from the plurality of conveyor cells 12. As shown in FIG. 1, the sorting portion 15 includes a plurality of chutes 81 for different classification destinations, the chutes being arranged along the first conveyance direction D1 of the conveyance path 11. For example, the sorting portion 15 includes a plurality of chutes 81 on the inward side and the outward side of the conveyance path 11, that is, on the right side and the left side of the conveyance path 11 as viewed in the first conveyance direction D1 when the first conveyance direction D1 is the counterclockwise conveyance direction.

The main controller 16 controls the state of the electric current flowing through the electromagnetic coil 32 of the linear synchronous motor 31, thereby controlling acceleration, deceleration, stop (emergency stop etc.), and the like of each conveyor cell 12. The main controller 16 stores layout information (e.g., positions of curves, the loading portion 13, and the sorting portion 15 on the conveyance path 11, directions and curvature radii of the curves, and the like) of the article sorting apparatus 10 in advance. The main controller 16 manages information on the article P (e.g., size, destination information, and the like of the article P) that is acquired by the information acquisition portion 14. The main controller 16 manages information on the length of the article P that is detected by the article length sensor 74.

The main controller 16 communicates with each of the loading portion 13, the information acquisition portion 14, and the sorting portion 15 in a wired manner or in a wireless manner to send/receive various types of information. The main controller 16 controls the operation of each of the loading portion 13, the information acquisition portion 14, and the sorting portion 15 by sending control instructions to these portions. The main controller 16 performs noncontact communication with the respective cell controllers 47 of the plurality of conveyor cells 12, thereby sending/receiving various types of information. The main controller 16 sends a control instruction to each cell controller 47, the control instruction instructing the control operation of the cell controller 47.

The main controller 16 synchronizes the acceleration/deceleration driving and stopping operations of the cross belt 61 by the motor 68 of each conveyor cell 12 with the transferring operation of an article P by each injector 71 so that the article P is delivered from the injector 71 of the loading portion 13 to the corresponding conveyor cell 12. The main controller 16 sends a control instruction to the cell controller 47 of each conveyor cell 12, the control instruction instructing execution of a series of receiving operations by acceleration/deceleration driving and stopping of the cross belt 61 by the motor 68 of the conveyor cell 12. The main controller 16 sends information on the length of the article P, which is detected by the article length sensor 74, to the cell controller 47 of each conveyor cell 12 together with the control instruction that instructs execution of the receiving operations.

When instructed by the main controller 16 to execute the receiving operations, the cell controller 47 of each conveyor cell 12 controls driving of the motor 68 using the data of the control pattern, which is stored in the memory unit 48 in advance, and the information on the length of the article P. The cell controller 47 of each conveyor cell 12 controls acceleration/deceleration driving and stopping of the motor 68, thereby controlling the receipt and retention of the article P by the cross belt 61. The cell controller 47 of each conveyor cell 12 controls the motor 68 such that the center position of the article P coincides with a predetermined position (e.g., center position or the like of the conveyor cell 12 with respect to the left-right direction) on the load surface A and the article P is retained in this state. When an article P is transferred from the injector 71 of the loading portion 13 onto the load surface A, the cell controller 47 of each conveyor cell 12, acquires information on the regenerative current of the motor 68 that is detected by the current sensor 69 during deceleration of the cross belt 61. Since there is a correlation between the magnitude of the regenerative current of the motor 68 and the magnitude of the weight of articles P, the cell controller 47 of each conveyor cell 12 detects the weight of an article P using data on the correlation between the regenerative current of the motor 68 and the weight of articles P, the data being stored in the memory unit 48 in advance. For example, the magnitude of the regenerative current of the motor 68 may be proportional to the magnitude of the weight of articles P.

The main controller 16 acquires information on the article P that is loaded on the load surface A of each conveyor cell 12 by the loading portion 13 from the information acquisition portion 14. The main controller 16 determines the classification destination of the article P based on the information on the article P that is received from the information acquisition portion 14, and selects the chute 81 corresponding to the determined classification destination from the plurality of chutes 81 of the sorting portion 15. The main controller 16 sets the timing of driving of the cross belt 61 by the motor 68 of each conveyor cell 12 (i.e., timing at which the article P is loaded into the chute 81) such that the article P is loaded into the selected chute 81 from the conveyor cell 12. The main controller 16 sends a control instruction to the cell controller 47 of each conveyor cell 12, the control instruction instructing the timing of driving of the cross belt 61 by the motor 68 of the conveyor cell 12.

The cell controller 47 of each conveyor cell 12 controls driving of the motor 68 using the driving timing that is specified by the main controller 16, the data of the control pattern of the discharging operation that is stored in the memory unit 48 in advance, and the information on the weight of the article P. The cell controller 47 of each conveyor cell 12 controls loading of the article P into the chute 81 by the cross belt 61, thereby sorting the article P in accordance with its classification destination corresponding to the information on the article P.

For example, if the weight of the article P is larger than a reference weight, the cell controller 47 of each conveyor cell 12 may change the driving start timing of the motor 68 relative to the data of the control pattern that is stored in advance such that the larger the weight of the article P, the more the driving start timing is advanced. Also, for example, if the weight of the article P is smaller than the reference weight, the cell controller 47 may change the driving start timing of the motor 68 relative to the data of the control pattern that is stored in advance such that the smaller the weight of the article P, the more the driving start timing is delayed. For example, in the case where the reference weight is an upper limit weight that can be handled by each conveyor cell 12, the cell controller 47 of each conveyor cell 12 may change the delay time of the driving start timing of the motor 68 such that the smaller the weight of the article P relative to the upper limit weight, the longer the delay time.

Moreover, for example, if the weight of the article P is larger than the reference weight, the cell controller 47 of each conveyor cell 12 may increase the torque of the motor 68 such that the larger the weight of the article P, the greater the torque. That is to say, the cell controller 47 changes the amount of current supplied to the motor such that the larger the weight of the article P, the larger the amount of the current or changes the pulse density such that the larger the weight of the article P, the higher the pulse density (i.e., the more the pulse density is increased). Moreover, for example, if the weight of the article P is smaller than the reference weight, the cell controller 47 may decrease the torque of the motor 68 such that the smaller the weight of the article P, the smaller the torque. That is to say, the cell controller 47 changes the amount of current supplied to the motor such that the smaller the weight of the article P, the smaller the amount of the current or changes the pulse density such that the smaller the weight of the article P, the lower the pulse density (i.e., the more the pulse density is decreased).

Moreover, for example, if the weight of the article P is larger than the reference weight, the cell controller 47 of each conveyor cell 12 may change the control gain in feedback control of the motor 68 such that the larger the weight of the article P, the larger the control gain. Moreover, for example, if the weight of the article P is smaller than the reference weight, the cell controller 47 may change the control gain in feedback control of the motor 68 such that the smaller the weight of the article P, the smaller the control gain. The feedback control of the motor 68 may be PID control, for example. Here, PID means that "P" performs proportional control, "I" performs integral control, and "D" performs derivative control.

Hereinafter, among the operations of the article sorting apparatus 10 according to the above-described embodiment, the operation for transferring articles P from the loading portion 13 to the conveyor cells 12 and the operation for releasing articles P from the conveyor cells 12 to the chutes 81 of the sorting portion 15 will be described. It should be noted that in the following description, it is assumed that each conveyor cell 12 moves along the conveyance path 11 at a constant conveyance speed V (e.g., a predetermined speed within a range of about 2.0 to 4.0 m/s).

When a conveyor cell 12 on which no article P is loaded enters the loading portion 13, the main controller 16 instructs the loading portion 13 to deliver an article P to that conveyor cell 12. The main controller 16 instructs the cell controller 47 of that conveyor cell 12 to control driving of the cross belt 61 by the motor 68 in synchronization with transfer of the article P by a certain injector 71 of the loading portion 13. The main controller 16 instructs the cell controller 47 to draw the article P from the injector 71 onto the load surface A of the cross belt 61 and to move the article P to a predetermined position (e.g., middle position or the like) on the load surface A.

Figure 7:
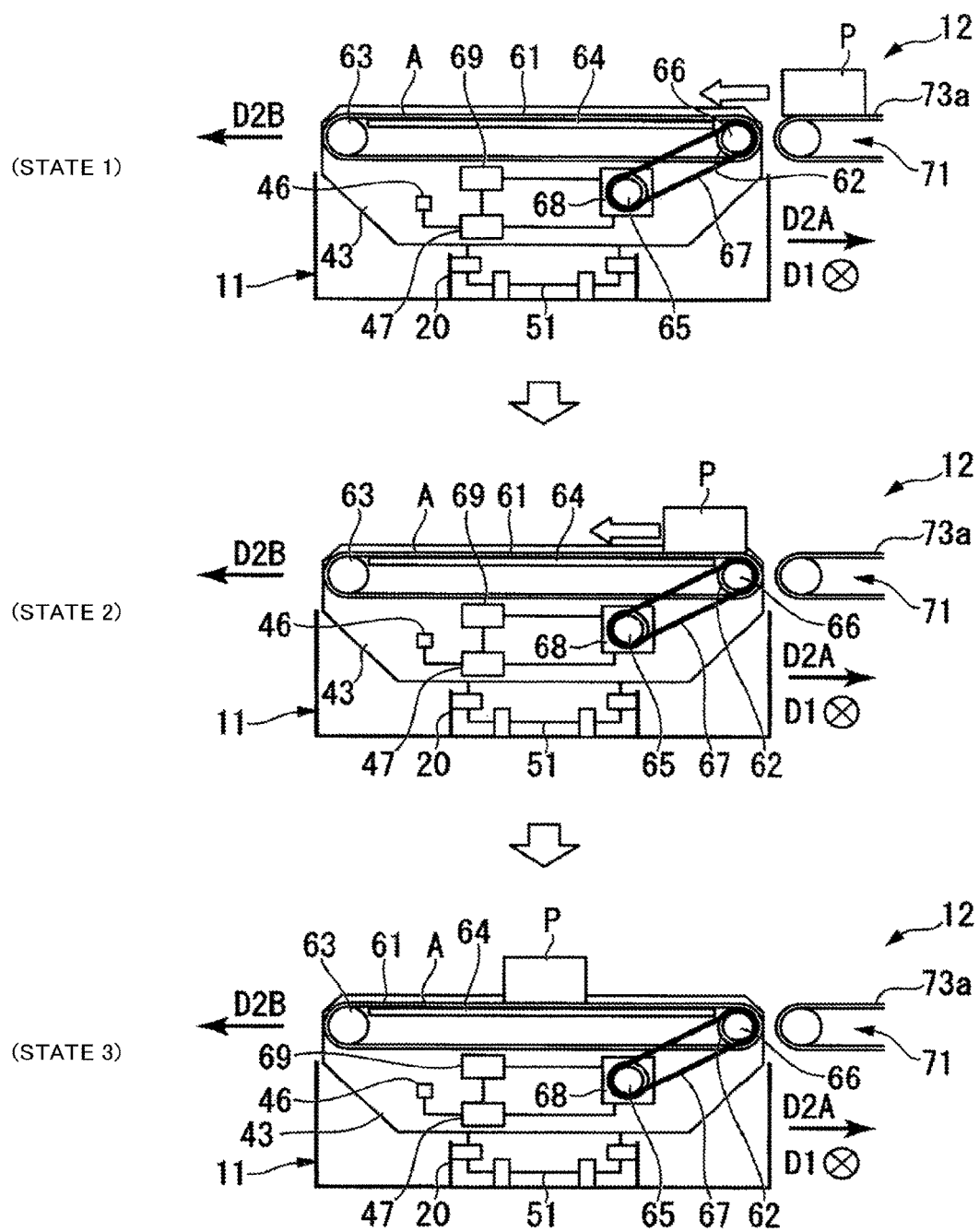
FIG. 7 shows side views illustrating an example of the operation of the article sorting apparatus according to the embodiment.

The loading portion 13 loads the article P onto the conveyor cell 12 in accordance with the control instruction from the main controller 16. The injector 71 of the loading portion 13 transfers the article P toward the conveyor cell 12 by driving of the first transfer belt 72a and the plurality of transfer belts 73a. The injector 71 sets a component in the first conveyance direction D1 of the transfer speed of the article P to be equal to the speed of the conveyor cell 12 in the first conveyance direction D1. The cell controller 47 of the conveyor cell 12 draws the article P from the injector 71 onto the load surface A of the cross belt 61 in accordance with the instruction from the main controller 16. As in State 1 shown in FIG. 7, the cell controller 47 sets the driving speed of the load surface A of the cross belt 61 to be equal to a second conveyance direction component of the speed of transfer of the article P by the injector 71. The loading portion 13 is disposed on the right side of the conveyance path 11 (on the first transfer direction D2A side of the conveyor cell 12) as viewed in the first conveyance direction D1. Thus, the cell controller 47 drives the load surface A of the cross belt 61 in the second transfer direction D2B and sets the driving speed of the cross belt 61 to be equal to the component in the second transfer direction D2B of the speed of transfer of the article P by the injector 71.

In order to draw the article P onto the load surface A from the plurality of second transfer belts 73a, the cell controller 47 of the conveyor cell 12 drives the cross belt 61 in synchronization with the transfer of the article P by the first transfer belt 72a and the plurality of second transfer belts 73a. The cell controller 47 controls a series of receiving operations by acceleration/deceleration driving and stopping of the cross belt 61 using the data of the control pattern that is stored in the memory unit 48 in advance and the information on the length of the article P. The cell controller 47 sets the driving speed of the cross belt 61 to be equal to the component in the second transfer direction D2B of the speed of transfer of the article P by the injector 71 and, in this state, receives the article P from the injector 71 onto the load surface A, as in State 2 shown in FIG. 7. After the entire article P has been loaded onto the load surface A, the cell controller 47 moves the article P to a predetermined position (e.g., middle position with respect to the second conveyance direction) on the load surface A, as in State 3 shown in FIG. 7. When the article P is transferred to the predetermined position on the load surface A, the cell controller 47 acquires information on the regenerative current of the motor 68 that is detected by the current sensor 69 during deceleration of the cross belt 61. Since there is a correlation between the magnitude of the regenerative current of the motor 68 and the magnitude of the weight of articles P, the cell controller 47 detects the weight of the article P using the data on the correlation between the regenerative current of the motor 68 and the weight of articles P, the data being stored in the memory unit 48 in advance.

It should be noted that if the loading portion 13 is disposed on the left side of the conveyance path 11 (on the second transfer direction D2B side of the conveyor cell 12) as viewed in the first conveyance direction D1, the cell controller 47 drives the load surface A of the cross belt 61 in the first transfer direction D2A when drawing the article P onto the load surface A. Thus, the cell controller 47 sets the driving speed of the cross belt 61 in the first transfer direction D2A to be equal to the component in the first transfer direction D2A of the speed of transfer of the article P by the injector 71.

When the conveyor cell 12 on which the article P is loaded enters the sorting portion 15 having the chute 81 corresponding to the classification destination of the article P, the main controller 16 instructs the cell controller 47 of the conveyor cell 12 to release the article P into the chute 81. The cell controller 47 of the conveyor cell 12 drives the cross belt 61 in accordance with the instruction from the main controller 16 and releases the article P on the load surface A of the cross belt 61 into the chute 81. The cell controller 47 controls driving of the motor 68 using the driving timing that is specified by the main controller 16, the data of the control pattern of the discharging operation that is stored in the memory unit 48 in advance, and the information on the weight of the article P. The cell controller 47 changes at least any one of the driving start timing of the motor 68, the amount of current and the pulse density of the current supplied to the motor 68, and the control gain in feedback control of the motor 68, for example, in accordance with the weight of the article P. The cell controller 47 makes the release timing from the cross belt 61 to the chute 81 uniform independently of the weight of articles P by changing the data of the control pattern of the discharging operation, which is stored in the memory unit 48 in advance, in accordance with the weight of each article P. The cell controller 47 sorts each article P in accordance with the sorting destination corresponding to the information on the article P by controlling loading of the article P to the chute 81 by the cross belt 61.

According to the above-described embodiment, since the cell controller 47 that changes the control pattern of the discharging operation of articles P in accordance with the weight of each article P is provided, the release timing from the cross belt 61 to the chute 81 can be made uniform independently of the weight of articles P. Providing the cell controller 47 that makes the release timing to the chute 81 uniform enables appropriate sorting of articles P without the necessity to increase the inlet width of the chutes 81, that is to say, while preventing an increase in the size of the conveyance path 11 and an increase in the installation area of the conveyance path 11. Since the current sensor 69 that detects the magnitude of the regenerative current of the motor 68, which is correlated with the weight of articles P, is provided, information on the weight of each article P can be acquired easily. The current sensor 69 is provided in each of the conveyor cells 12. Thus, each conveyor cell 12 can change the control pattern of the motor 68 in accordance with the weight of articles P in an independent and autonomous manner, and the apparatus configuration and the control processing can be prevented from becoming complicated.

If a cell controller 47 that changes the driving start timing of the motor 68 in accordance with the weight of articles P is provided, a delay in the start timing of the motor 68 due to a relatively large weight of an article P can be prevented, and thus the release timing can be made uniform. If a cell controller 47 that changes the pulse density of the current supplied to the motor 68 in accordance with the weight of articles P is provided, a delay in the start of the motor 68 due to a relatively large weight of an article P can be prevented, and thus the release timing can be made uniform. If a cell controller 47 that changes the control gain in feedback control of the motor 68 in accordance with the weight of articles P is provided, a delay in response of the motor 68 due to a relatively large weight of an article P can be prevented, and thus the release timing can be made uniform. Moreover, if a cell controller 47 that decreases the control gain as the weight of the article P becomes lower is provided, the occurrence of a self-excited vibration can be prevented.

Hereinafter, modifications will be described. In the above-described embodiment, the cell controller 47 of each conveyor cell 12 changes the control details from the data of the control pattern that is stored in advance in accordance with the magnitude relationship between the weight of an article P and the reference weight. However, the present invention is not limited to this. The cell controller 47 may also control the motor 68 by acquiring a control pattern appropriate for the weight of an article P from data indicating the correspondence relationship between a plurality of different weights of articles P and a plurality of different control patterns, the data being stored in the memory unit 48 in advance.

Figure 8:
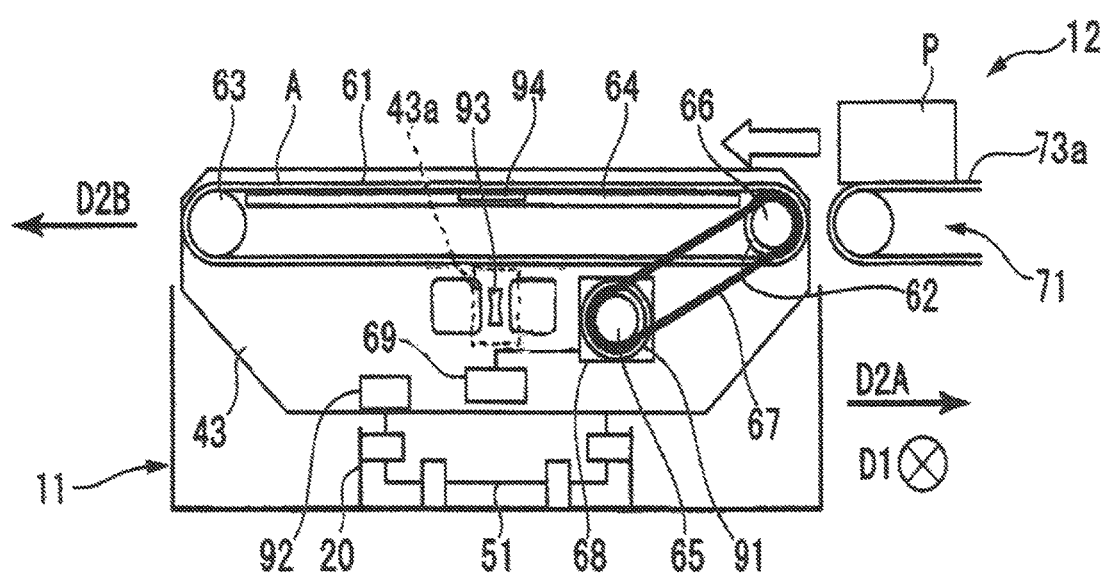
FIG. 8 is a cross-sectional view schematically showing the configuration of a portion of an article sorting apparatus according to a modification of the embodiment.

In the above-described embodiment, the conveyor cells 12 each include the current sensor 69 that detects the magnitude of the regenerative current of the motor 68, which is correlated with the weight of articles P. However, the present invention is not limited to this. As shown in FIG. 8, the conveyor cells 12 may each include at least any one of the current sensor 69, a rotation angle sensor 91, an acceleration sensor 92, a strain gauge 93, and a pressure sensor 94 as a sensor that detects weight information correlated with the weight of articles P.

The rotation angle sensor 91 may be a rotary encoder, for example. The rotation angle sensor 91 detects the rotation angle of the motor 68, the driving roller 62, the driven roller 63, and the like. During transfer of an article P from the injector 71 of the loading portion 13 onto the load surface A, the cell controller 47 acquires information on the rotation angle that is detected by the rotation angle sensor 91 during a period of time between the start of deceleration and the stop of the cross belt 61. In the case of an article P having a large weight, the change in the rotation angle of the motor 68 or the like tends to be delayed from a control instruction that is input to the motor 68, when compared with the case of an article P having an average weight. Thus, there is a correlation between the length of delay of the change in the rotation angle of the motor 68 or the like relative to the control instruction and the magnitude of the weight of articles P, and therefore the cell controller 47 detects the weight of an article P using data on the correlation between the rotation angle of the motor 68 or the like and the weight of articles P, the data being stored in the memory unit 48 in advance. The length of delay of the change in the rotation angle relative to the control instruction is positively correlated with the magnitude of the weight of articles P, and may be proportional to the magnitude of the weight of articles P, for example.

The acceleration sensor 92 may be a three-axis acceleration sensor, for example. The acceleration sensor 92 detects vibration of the conveyor cell 12 that occurs in various directions including the left-right direction, the vertical direction, the front-rear direction, and the like. During transfer of an article P from the injector 71 of the loading portion 13 onto the load surface A, the cell controller 47 acquires information on the amplitude of vibration of the conveyor cell 12 that is detected by the acceleration sensor 92. Since there is a correlation between the amplitude of vibration of the conveyor cell 12 and the magnitude of the weight of articles P, the cell controller 47 detects the weight of an article P using data on the correlation between the amplitude of vibration of the conveyor cell 12 and the weight of articles P, the data being stored in the memory unit 48 in advance. For example, the amplitude of vibration of the conveyor cell 12 may be proportional to the magnitude of the weight of articles P.

The strain gauge 93 detects the magnitude of strain generated in the frame portion 43 or the like. During transfer of an article P from the injector 71 of the loading portion 13 onto the load surface A, the cell controller 47 acquires information on the magnitude of strain in the frame portion 43 or the like that is detected by the strain gauge 93. Since there is a correlation between the magnitude of strain generated in the frame portion 43 or the like and the magnitude of the weight of articles P, the cell controller 47 detects the weight of an article P using data on the correlation between the magnitude of strain generated in the frame portion 43 or the like and the weight of articles P, the data being stored in the memory unit 48 in advance. For example, the magnitude of strain generated in the frame portion 43 or the like may be proportional to the magnitude of the weight of articles P. The strain gauge 93 may be disposed in a uniaxial stress region 43*a* such as a beam that is provided at a middle portion of the frame portion 43, for example. Moreover, the measurement accuracy may be improved by providing a dummy gauge for compensation at a portion different from the portion where the strain gauge 93 is disposed and bridge-connecting the strain gauge 93 and the dummy gauge.

The pressure sensor 94 detects the magnitude of pressure exerted on the belt support board 64 by the cross belt 61. During transfer of an article P from the injector 71 of the loading portion 13 onto the load surface A, the cell controller 47 acquires information on the magnitude of pressure exerted on the belt support board 64 that is detected by the pressure sensor 94. Since there is a correlation between the magnitude of pressure exerted on the belt support board 64 and the magnitude of the weight of articles P, the cell controller 47 detects the weight of an article P using data on the correlation between the magnitude of pressure exerted on the belt support board 64 and the weight of articles P, the data being stored in the memory unit 48 in advance. For example, the magnitude of pressure exerted on the belt support board 64 may be proportional to the magnitude of the weight of articles P.

Although the conveyance path 11 and the plurality of conveyor cells 12 are provided with the linear synchronous motor 31 in the above-described embodiment, the present invention is not limited to this, and it is also possible that a linear induction motor is provided. Moreover, it is also possible that each conveyor cell 12 is provided with a driving wheel and a motor that drives and rotates the driving wheel, instead of the linear synchronous motor 31, and travels along the conveyance path 11 using the motor as a traveling driving source. Moreover, it is also possible that each conveyor cell 12 is conveyed along the conveyance path 11 by a transmission mechanism that mechanically transmits the driving force, instead of the linear synchronous motor 31. For example, a configuration may be adopted in which a flat plate is provided extending downward in the vertical direction from the chassis 51 of the chassis portion 41, and a driving force in the first conveyance direction D1 is applied by holding an end portion of the flat plate between a pair of rollers that are driven and rotated by a motor and that are located on opposite sides of the end portion with respect to the thickness direction thereof.

Although the noncontact feeding portion 34 is provided along the entire length of the conveyance path 11 in the above-described embodiment, the present invention is not limited to this, and it is also possible that the noncontact feeding portion 34 is provided in a portion of the conveyance path 11. The noncontact feeding portion 34 may be provided at least in the loading portion 13, the sorting portion 15, and around the curves (e.g., around the exits of the respective curves). In the above-described embodiment, it is also possible that each conveyor cell 12 includes, with respect to the power that is fed from the noncontact feeding portion 34, an AC/DC converter that converts the power to direct current, a transformer that increases or reduces the voltage, a rectifying accumulator, as well as a capacitor, a battery, and the like for accumulating electricity.

In the above-described embodiment, the noncontact feeding portion 34 feeds power from the conveyance path 11 to each conveyor cell 12 in a contactless manner by electromagnetic induction; however, the present invention is not limited to this. For example, the noncontact feeding portion 34 may feed power from the conveyance path 11 to each conveyor cell 12 in a contactless manner by radio transmission and reception, magnetic field resonance, electric field coupling, or the like.

In the above-described embodiment, conveyor cells 12 that are adjacent to each other on the front side and the rear side in the first conveyance direction D1 are coupled to each other by their respective connection mechanisms 53; however, the present invention is not limited to this, and the plurality of conveyor cells 12 may be separate from and independent of each other.

In the above-described embodiment, a servo motor is used as the motor 68; however, the present invention is not limited to this, and, for example, a DC motor, a brushless DC motor, a stepping motor, or the like may also be used as the motor 68.

In the above-described embodiment, each chute 81 of the sorting portion 15 may also include a conveyance portion such as a belt conveyor that is operable to draw in the article P released from the cross belt 61 of each conveyor cell 12.

According to at least one of the above-described embodiments, since the cell controller 47 that changes the control pattern of the discharging operation of articles P in accordance with the weight of articles P is provided, the release timing from the cross belt 61 to the chute 81 can be made uniform independently of the weight of articles P. Providing the cell controller 47 that makes the release timing to the chute 81 uniform enables appropriate sorting of articles P without the necessity to increase the inlet width of the chutes 81, that is to say, while preventing an increase in the size of conveyance path 11 and an increase in the installation area of the conveyance path 11. The sensor that detects the weight information correlated with the weight of articles P is provided in each of the conveyor cells 12. Thus, each conveyor cell 12 can change the control pattern of the motor 68 in accordance with the weight of articles P in an independent and autonomous manner, and the apparatus configuration and the control processing can be prevented from becoming complicated.

While certain embodiments of the present invention have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An article sorting apparatus comprising:
a conveyance path extending in a first conveyance direction;
at least one conveyance unit including a belt that forms a load surface on which an article is placed and a driving portion for driving the belt, the conveyance unit being configured to move along the conveyance path and to convey the article placed on the load surface in a second conveyance direction that intersects the first conveyance direction;
a loading portion configured to load the article onto the load surface of the at least one conveyance unit;
a sorting portion configured to sort the article received from the at least one conveyance unit;
a weight information detector including a sensor provided on the conveyance unit configured to detect weight information correlated with a weight of the article that is transferred from the loading portion onto the load surface; and
a controller configured to control driving of the driving portion in accordance with the weight information detected by the weight information detector, thereby transferring the article placed on the load surface to the sorting portion.

2. The apparatus according to claim 1, wherein the driving portion includes a rotating member configured to rotate as the belt is driven, the weight information detector includes a rotation angle sensor configured to detect a rotation angle of the rotating member, and during transfer of the article from the loading portion to the belt in a driven state, the weight information detector detects the weight information correlated with the weight of the article using information on the rotation angle of the rotating member that is detected by the rotation angle sensor during a period of time between a start of deceleration and a stop of the belt.

3. The apparatus according to claim 1, wherein the weight information detector includes a strain gauge configured to detect a magnitude of a strain in the conveyance unit, and during transfer of the article from the loading portion to the belt in a driven state, the weight information detector detects the weight information correlated with the weight of the article using information on the magnitude of the strain in the conveyance unit that is detected by the strain gauge.

4. The apparatus according to claim 3, wherein the strain gauge is disposed in a uniaxial stress region provided in the conveyance unit.

5. The apparatus according to claim 1, wherein a support member for supporting the belt from a back face side relative to the load surface is provided, the weight information detector includes a pressure sensor configured to detect a magnitude of a pressure exerted on the support member by the belt, and during transfer of the article from the loading portion to the belt in a driven state, the weight information detector detects the weight information correlated with the weight of the article using information on the magnitude of the pressure exerted by the belt that is detected by the pressure sensor.

6. The apparatus according to claim 1, wherein during transfer of the article placed on the load surface to the sorting portion, the controller is configured to advance a driving start timing of the driving portion such that the larger the weight of the article relative to a reference weight, the more the driving start timing is advanced, the weight of the article being obtained from the weight information, or to delay the driving start timing such that the smaller the weight of the article relative to the reference weight, the more the driving start timing is delayed, the weight of the article being obtained from the weight information.

7. The apparatus according to claim 1, wherein during transfer of the article placed on the load surface to the sorting portion, the controller is configured to increase a driving force of the driving portion such that the larger the weight of the article relative to a reference weight, the larger the driving force, the weight of the article being obtained from the weight information, or to decrease the driving force such that the smaller the weight of the article relative to the reference weight, the smaller the driving force, the weight of the article being obtained from the weight information.

8. The apparatus according to claim 1, wherein the driving portion is a servo motor, and during transfer of the article placed on the load surface to the sorting portion, the controller is configured to change a control gain in feedback control of the driving portion such that the larger the weight of the article relative to a reference weight, the larger the control gain, the weight of the article being obtained from the weight information, or to change the control gain such that the smaller the weight of the article relative to the reference weight, the smaller the control gain, the weight of the article being obtained from the weight information.

9. An article sorting apparatus comprising:

a conveyance path extending in a first conveyance direction;

at least one conveyance unit including a belt that forms a load surface on which an article is placed and a driving portion for driving the belt, the conveyance unit being configured to move along the conveyance path and to convey the article placed on the load surface in a second conveyance direction that intersects the first conveyance direction;

a loading portion configured to load the article onto the load surface of the at least one conveyance unit;

a sorting portion configured to sort the article received from the at least one conveyance unit;

a weight information detector configured to detect weight information correlated with a weight of the article that is transferred from the loading portion onto the load surface; and a controller configured to control driving of the driving portion in accordance with the weight information detected by the weight information detector, thereby transferring the article placed on the load surface to the sorting portion, wherein the driving portion includes a motor, the weight information detector includes a current sensor configured to detect a current flowing through the motor, and during transfer of the article from the loading portion to the belt in a driven state, the weight information detector detects the weight information correlated with the weight of the article using information on a regenerative current flowing through the motor that is detected by the current sensor during deceleration of the belt.

10. An article sorting apparatus comprising:

a conveyance path extending in a first conveyance direction;

at least one conveyance unit including a belt that forms a load surface on which an article is placed and a driving portion for driving the belt, the conveyance unit being configured to move along the conveyance path and to convey the article placed on the load surface in a second conveyance direction that intersects the first conveyance direction;

a loading portion configured to load the article onto the load surface of the at least one conveyance unit;

a sorting portion configured to sort the article received from the at least one conveyance unit;

a weight information detector configured to detect weight information correlated with a weight of the article that is transferred from the loading portion onto the load surface; and a controller configured to control driving of the driving portion in accordance with the weight information detected by the weight information detector, thereby transferring the article placed on the load surface to the sorting portion, wherein the weight information detector includes an acceleration sensor configured to detect an amplitude of vibration of the conveyance unit, and during transfer of the article from the loading portion to the belt in a driven state, the weight information detector detects the weight information correlated with the weight of the article using information on the amplitude of the vibration of the conveyance unit that is detected by the acceleration sensor.

* * * * *